US012539702B2

(12) United States Patent
Hollands et al.

(10) Patent No.: US 12,539,702 B2
(45) Date of Patent: Feb. 3, 2026

(54) INKJET PRINT HEAD WITH CONTINUOUS FLOW AND IMPROVED TEMPERATURE UNIFORMITY

(71) Applicant: CANON KABUSHIKI KAISHA, Tokyo (JP)

(72) Inventors: Peter J. Hollands, Baarlo (NL); Petrus W.A.M. Aerts, Tienray (NL)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 18/337,201

(22) Filed: Jun. 19, 2023

(65) Prior Publication Data

US 2024/0010003 A1 Jan. 11, 2024

(30) Foreign Application Priority Data

Jul. 8, 2022 (EP) .................................... 22183826

(51) Int. Cl.

*B41J 2/175* (2006.01)
*B41J 2/03* (2006.01)
*B41J 2/145* (2006.01)
*B41J 2/185* (2006.01)

(52) U.S. Cl.

CPC ............. *B41J 2/17523* (2013.01); *B41J 2/03* (2013.01); *B41J 2/145* (2013.01); *B41J 2/185* (2013.01); *B41J 2202/12* (2013.01)

(58) Field of Classification Search

CPC . B41J 2/17523; B41J 2/03; B41J 2/145; B41J 2/185; B41J 2202/12; B41J 2002/14419; B41J 2/14233; B41J 2/14145

USPC ............................................................ 347/47

See application file for complete search history.

(56) References Cited

U.S. PATENT DOCUMENTS

| | | | | |
|---|---|---|---|---|
| 10,391,768 | B2 | 8/2019 | Reinten | |
| 2009/0284572 | A1 | 11/2009 | Katoh | |
| 2016/0297193 | A1* | 10/2016 | Yoshida | B41J 2/135 |
| 2018/0244047 | A1 | 8/2018 | Muto | |
| 2018/0290450 | A1 | 10/2018 | Reinten | |
| 2020/0031134 | A1 | 1/2020 | Mizuno | |

FOREIGN PATENT DOCUMENTS

JP 2009247938 A 10/2009

* cited by examiner

*Primary Examiner* — Jason S Uhlenhake
*Assistant Examiner* — Alexander D Shenderov
(74) *Attorney, Agent, or Firm* — Canon U.S.A., Inc. IP Division

(57) ABSTRACT

The present invention relates to an inkjet print head comprising an ink handling system comprising an ink entry port arranged to supply ink at a central position with reference to the length of the nozzle array, in particular at a position halfway the length of the nozzle array. The ink handling system further comprises two ink return ports, each arranged at each opposite end of the nozzle array for decentralized ink return. The ink handling system is configured such that in operation ink is circulated through the ink handling system such that the ink flows from the ink entry port to both ink return ports in opposite directions in heat exchanging contact with the droplet forming device. In another aspect, the invention relates to a printer comprising at least one print head according to the present invention.

10 Claims, 2 Drawing Sheets

INKJET PRINT HEAD WITH CONTINUOUS FLOW AND IMPROVED TEMPERATURE UNIFORMITY

FIELD OF THE INVENTION

The invention relates to an inkjet print head.

BACKGROUND OF THE INVENTION

Inkjet print heads are known for example from U.S. Pat. No. 10,391,768 B2. Such a print head comprises a plurality of a droplet jetting devices formed of a nozzle layer defining, for each droplet jetting device, a nozzle, a membrane layer carrying, on a membrane, a restrictor layer and an actuator for generating pressure waves in a liquid in a pressure chamber that is connected to the nozzle, the actuator being positioned in an actuator chamber in the restrictor layer, and a distribution layer defining a supply line for supplying the liquid to the pressure chamber. It is further known to provide the pressure chamber with an additional outlet to allow for a constant throughflow of ink through the pressure chamber, for example from US 2020031134 A1.

US 2018244047 A1 discloses a liquid ejecting apparatus that includes a flow path member including a common liquid chamber communicating with each of a plurality of nozzles formed in a nozzle surface, via a corresponding pressure generating chamber, a supply port provided in an inner wall of the common liquid chamber to supply a liquid to the common liquid chamber, a discharge port provided in a ceiling of the common liquid chamber to discharge an air bubble from the common liquid chamber to discharge an air bubble from the common liquid chamber, and a wall continuously extending from the inner wall, and including a surface opposing the discharge port.

It is further known that print heads comprise an array of nozzles that are all fluidly connected to an ink supply line and an ink return line in order to be able to create ink circulation. Commonly the ink supply line is arranged at one end of the array of nozzles and the ink return line at the opposite end of the array of nozzles.

In operation, the print head heats up due to resistance of the present electrical traces and due to energy dissipation of the actuators.

It is a disadvantage of the known print heads that the supplied ink flows along the entire length of the print head and is heated up along the length of the print head. This leads to temperature non uniformity of the ink flowing to the plurality of pressure chambers connected to the plurality of nozzles. Non uniformity of the temperature of the ink in turn leads to non-uniform droplet formation from adjacent nozzles, leading to visible print artefacts.

SUMMARY OF THE INVENTION

It is an object of the invention to provide a print head with throughflow capability with improved temperature uniformity across the nozzle array.

This object is at least partly achieved by providing a print head according to claim 1.

Therefore, in a first aspect the invention relates to an inkjet print head comprises a droplet forming device having a plurality of nozzles formed in a surface of the droplet forming device. Each of the plurality of nozzles is in fluid communication with one of a plurality pressure generating chambers. The droplet forming device further comprises a plurality of actuators, each of which being operatively connected to a corresponding pressure generating chamber of the plurality of pressure generating chambers and configured to generate energy for ejecting ink in the form of ink droplets. The plurality of nozzles are arranged in an array extending in a first direction. The droplet forming device may have a length L extending in the direction of the array of a plurality of nozzles, i.e. the first direction.

The print head further comprises an ink handling system having an ink storage volume which is in fluid connection with the plurality of pressure generating chambers of the droplet forming device. The ink handling system comprises an ink entry port configured to supply ink to the ink storage volume, preferably at a central position with reference to the length L of the droplet forming device. The ink handling system further comprises two ink return ports: a first ink return port configured to collect ink from the ink storage volume, a second ink return port configured to collect ink from the ink storage volume, wherein the first ink return port is disposed at one end of the inkjet print head and the second ink return port is disposed at an opposite end of the inkjet print head with respect to an arrangement direction of the nozzles, i.e the first direction, and the ink entry port is disposed between the first ink return port and the second ink return port. Therefore, the first ink return port and the second return port are arranged at positions in the ink handling system corresponding to each opposite end of the droplet forming device, and hence corresponding to each end of the array of a plurality of nozzles.

The ink handling system is configured such that in operation ink is circulated through the ink handling system such that the ink flows from the ink entry port to the first ink return port and the second ink return port in opposite directions parallel to the first direction, i.e. along the length L of the droplet forming device in heat exchanging contact with the droplet forming device.

Said inkjet print head comprises an ink handling system comprising an ink entry port arranged to supply ink at a central position with reference to the length of the nozzle array, in particular at a position halfway the length of the nozzle array. The ink handling system further comprises two ink return ports, each arranged at each opposite end of the nozzle array for decentralized ink return.

In an embodiment, the ink storage volume (comprised in the ink handling system) comprises a manifold, the manifold being in fluid connection with each nozzle of the array of a plurality of nozzles via the corresponding pressure generating chamber. The ink entry port, the first ink return port and the second ink return port are in fluid connection with the manifold.

In other words, the manifold comprises a centralized ink entry port and two ink return ports, each arranged at opposite ends of the manifold, such that in operation an ink flow is forced as described above in close heat exchanging contact with the droplet forming device.

In the context of the present invention, the central position of the ink entry port, with reference to the length of the nozzle array (extending in the first direction) is to be construed as a position different from the positions of each opposite ends of the nozzle array, such that in operation a feed flow of ink entering the entry port bifurcates into two separate partial flows in opposite directions parallel to the first direction (i.e. along the length L of the droplet forming device or along the length of the nozzle array). The central position of the ink entry port creates two ink paths: a first ink path from the ink entry port to a first ink return port arranged at one end of the ink handling system and a second ink path from the ink entry port to a second ink return port arranged at the opposite end of the ink handling system. The length of the first ink path $L_1$ may be equal to or different from the length of the second ink path $L_2$. In particular $a*L_1 \leq L_2 \leq L_1$ and $L_1+L_2=L$, wherein a may be any value in the range of 0.1 to 1, preferably 0.5 to 1, more preferably 0.7 to 1, more preferably 0.9 to 1. In a particular example the lengths of both ink paths are equal to each other: $L_1=L_2=0.5*L$.

In an embodiment, the manifold comprises an elongated ink chamber extending in a second direction substantially parallel to the first direction, in a third direction substantially parallel to a width W of the array of the plurality of nozzles and perpendicular to the second direction and in a fourth direction perpendicular to the second and third directions, the third and fourth directions form a cross sectional area of the elongated chamber, the size of said cross sectional area is smaller than or equal to the size of the cross sectional area of the ink entry port.

The ink handling system according to the present invention forces bifurcation of the ink flow entering the manifold thus creating two (partial) flows in opposite directions along each part of the length L of the droplet forming device defined by the position of the ink entry port with respect to the length L of the droplet forming device and towards both ink return ports arranged at each opposite end of the array of a plurality of nozzles (i.e. at each opposite end of the manifold, corresponding to the opposite ends of the droplet forming device). Both partial flows are in heat exchanging contact with a respective parts of the length of the droplet forming device.

In an embodiment, the droplet forming device is a micro-machined ink jet printing device. In a further embodiment, the ink handling system is an integral part of the micro-machined ink jet printing device.

Micro-machined ink jet printing device in this context is also known as a MEMS (Micro-Electro-Mechanical System) chip or printhead.

In an embodiment, the ink entry port is arranged halfway a distance D between the first ink return port and the second ink return port, i.e. halfway the length L of the droplet forming device (or halfway the array of the plurality of nozzles).

The ink handling system according to the present invention forces bifurcation of the ink flow entering the manifold thus creating two (partial) flows in opposite directions along each half of the length L of the droplet forming device defined by the position of the ink entry port with respect to the length L of the droplet forming device and towards both ink return ports arranged at each opposite end of the array of a plurality of nozzles (i.e. at each opposite end of the manifold, corresponding to the opposite ends of the droplet forming device). Both partial flows are in heat exchanging contact with a respective half of the length of the droplet forming device.

In an embodiment the array of a plurality of nozzles comprises a first nozzle arranged at one end of the array and a last nozzle arranged at the opposite end of the array, the ink entry port is arranged such that the distance between the ink entry port and the first nozzle is substantially equal to the distance between the ink entry port and the last nozzle.

In a further embodiment, the first ink return path is arranged in the direct vicinity of the first nozzle and the second ink return port is arranged in the direct vicinity of the last nozzle. The first and the second ink return paths are hence arranged at opposite ends of the ink handling system.

In another aspect, the invention relates to a printer comprising at least one print head according to the first aspect of the present invention.

In this print head configuration a (circulating) flow of ink is forced along the nozzle array in heat exchanging contact with said nozzle array.

In the print head configuration of the present invention, the path length of the ink circulation path along the nozzle array is reduced with a factor 2 compared to a configuration where the ink entry port is located at one end of the nozzle array and the ink return port at the opposite end of the nozzle array. Therefore, the contact time of the ink with heat generating elements in the print head is reduced with a factor 2, hence improving the temperature uniformity across the length of the print head.

An additional advantage of the present invention is that due to a shorter ink path length, the pressure drop across the ink line is also significantly reduced.

Hence, by applying the ink handling system in accordance with the present invention the temperature uniformity and the pressure uniformity among the plurality of nozzles is significantly improved from which the drop formation process and eventually the print quality benefits to a large extend.

More specific optional features of the invention are indicated in the dependent claims.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
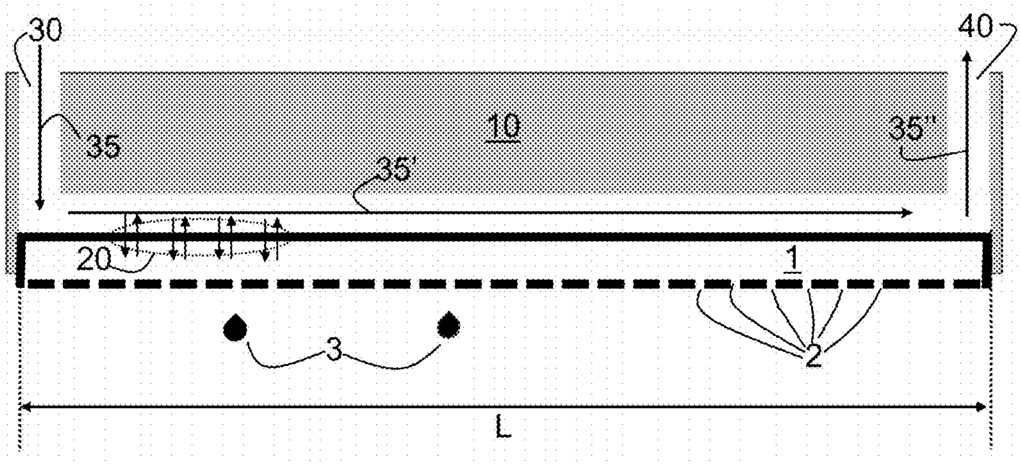
FIG. 1 is a schematic cross-sectional front view of a portion of a comparative example of a print head.

The present invention will now be described with reference to the accompanying drawings, wherein the same reference numerals have been used to identify the same or similar elements throughout the several views.

FIG. 1 shows a schematic cross-sectional front view of a portion of a comparative example of a print head. The print head comprises a droplet forming device 1, e.g. a micro-machined inkjet printing device also termed MEMS chip. The drop forming device 1 comprises a plurality of nozzles arranged in an array 2 or multiple parallel arrays for ejecting ink droplets 3. Each of the plurality of nozzles is fluidly connected to a pressure generating chamber (not shown). The pressure generating chamber is arranged to contain a certain volume of ink that can be pressurized (e.g. with the aid a of a piezo actuator or thermistor in case of bubble jet printing) such that droplets of ink are expelled from the associated nozzle. The pressure generating chamber has an ink entry port (not shown) for feeding ink to the pressure generating chamber. Optionally, the pressure generating chamber may comprise an ink exit port for (re)circulation of ink through the pressure generating chamber.

The print head further comprises an ink handling system 10 arranged to supply ink to the drop forming device 1. The ink handling system 10 (e.g. a manifold) is in fluid connection with each pressure generating chamber arranged in the drop forming device 1. In a so-called dead-end configuration, all ink that is fed to the pressure generating chamber is expelled as ink droplets. In a so-called through flow configuration, the ink present in the pressure generating chamber is at least partly returned via the ink exit port of the pressure generating chamber. The exchange of ink between the ink handling system 10 and the plurality of pressure generating chambers is indicated in FIG. 1 with arrows 20.

The ink handling system 10 shown in FIG. 1 further comprises an ink entry port 30 arranged at one end of the ink handling system and an ink return port 40 arranged at an opposite end of the ink handling system. In this comparative example an ink path along the droplet forming device 1 is created with a length L as indicated with a double arrow in FIG. 1. The ink flow through the ink handling system 10 is indicated with arrows 35, 35' and 35".

The return port 40 may be connected to an ink storage volume, from which an ink flow to the ink entry port 30 is provided, hence creating a circulating ink flow. During the circulation of the ink, the ink is in heat exchanging contact with the droplet forming device 1. Due to heat dissipation in the droplet forming device 1, the ink will heat up while flowing along the droplet forming device 1, leading to a temperature difference across the length of the drop forming device 1. Said temperature difference (i.e. temperature non-uniformity) may influence jetting properties across the nozzle array and hence lead to undesired print artefacts.

Figure 2A:
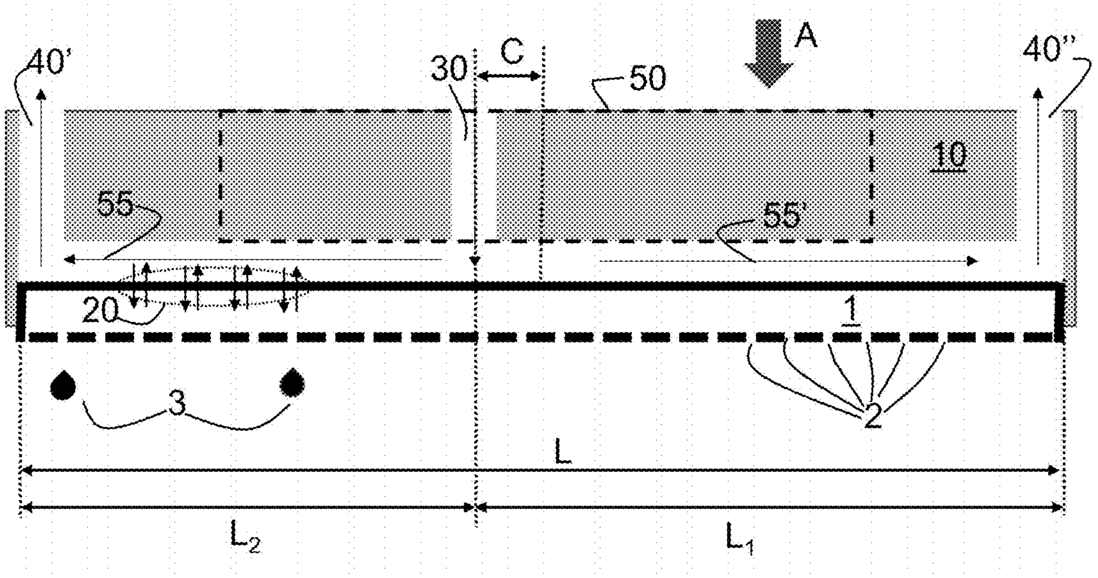
FIG. 2A is a schematic cross-sectional front view of a portion of a print head according to an embodiment of the present invention.

FIG. 2A shows a schematic cross-sectional front view of a portion of a print head according to an embodiment of the present invention which provides a reduction of the temperature non-uniformity across the nozzle array. The ink entry port 30 is arranged at a central position of the ink handling system 10. The central position is to be construed as a position in a central region of the ink handling system, indicated with intermitted line 50. The ink handling system 10 further comprises two ink return ports: a first ink return port 40' and a second ink return port 40" arranged at positions in the ink handling device 10 corresponding to the opposing ends of the droplet forming device 1.

In operation, ink entering the entry port bifurcates into two separate partial flows in opposite directions along the length L of the droplet forming device or along the length of the nozzle array, the flow directions are indicated with arrows 55 and 55'. In this particular example the length L of the droplet forming device is substantially equal to the distance D (as stated above) between the first ink return port 40' and the second ink return port 40". The central position of the ink entry port creates two ink paths: a first ink path from the ink entry port to a first ink return port arranged at one end of the ink handling system and a second ink path from the ink entry port to a second ink return port arranged at the opposite end of the ink handling system. The length of the first ink path $L_1$ may be equal to or different from the length of the second ink path $L_2$. In particular $a*L_1 \leq L_2 \leq L_1$ and $L_1+L_2=L$, wherein a may be any value in the range of 0.1 to 1, preferably 0.5 to 1, more preferably 0.7 to 1, more preferably 0.9 to 1. In a particular example the lengths of both ink paths are equal to each other: $L_1=L_2=0.5*L$.

The lengths of the ink paths, $L_1$ and $L_2$, in this embodiment are both reduced with respect to the length of the ink path L shown in FIG. 1. Hence the contact time of the ink with the heat generating droplet forming device 1 in operation (e.g. in (re)circulation) is reduced. As a result the temperature difference across the nozzle array is reduced, leading to a more uniform jetting process within the nozzle array.

For optimal temperature uniformity, the lengths of both ink paths, $L_1$ and $L_2$, should be equal. However, depending on the further configuration of the print head or even an assembly of multiple print heads and in view of optimizing pressure drop across all ink feed and return paths, the paths' lengths may be selected (slightly) different from one another. In the embodiment shown in FIG. 2A the location of the ink entry port 30 is slightly offset from the exact center of the ink handling device, i.e. offset from the center of the nozzle array, as indicated with double arrow C.

Figure 2B:
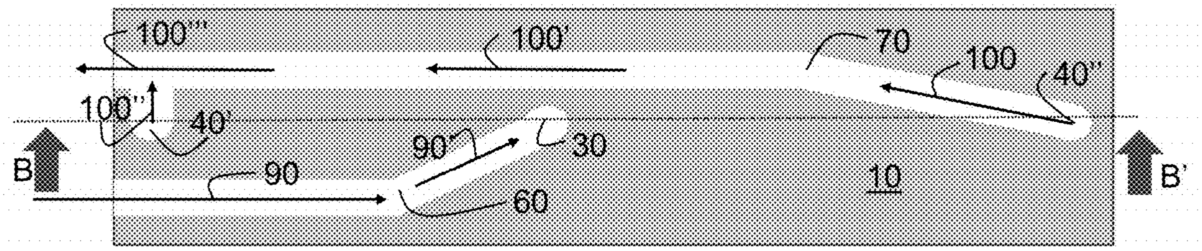
FIG. 2B is a schematic cross-sectional top view of a portion of a print head according to an embodiment of the present invention.

FIG. 2B shows a schematic cross-sectional top view of a portion of a print head shown in FIG. 2A, in particular in the direction of arrow A (the cross sectional view shown in FIG. 2A is in the direction indicated with arrows B and B' in FIG. 2B).

FIG. 2B shows an ink feed channel 60 in fluid connection with ink entry port 30 and an ink return channel 70 in fluid connection with the first and second ink return ports 40' and 40' respectively'. The ink feed channel and ink return channel are not connected to one another in the ink handling device 10. Flow directions are indicated with arrows 90, 90' and 100, 100', 100". 100", wherein the arrows 90', 90' indicate the ink feed flow towards the droplet forming device 1 and arrows 100, 100', 100", 100'" indicate the return flow from the droplet forming device.

Figure 3A:
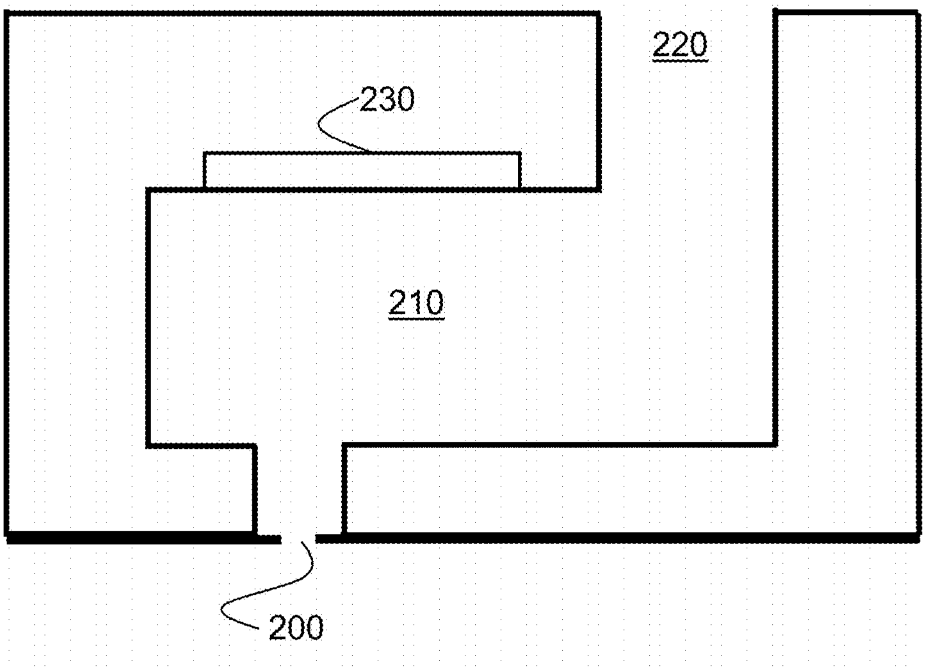
FIG. 3A is a schematic representation of a part of the drop forming device as shown in FIGS. 1 and 2A.

FIG. 3A shows a schematic representation of a part of a drop forming device, comprising a single nozzle 200 in fluid connection with a single pressure generating chamber 210 and an ink feed channel 220 in fluid connection with the pressure generating chamber 210. The ink feed channel 220 is also in fluid connection with the ink handling system 10 (e.g. a manifold) as shown in FIGS. 1 and 2A.

FIG. 3A further shows an actuator 230, which may be a heater in case of a bubble jet inkjet process. In bubble jet ink jet, ink present in the pressure generating chamber is locally (i.e. in the vicinity of the heater) heated in order to create a pressure wave that propagates through the pressure generating chamber and results in expelling droplets of ink out of the nozzle 200.

Figure 3B:
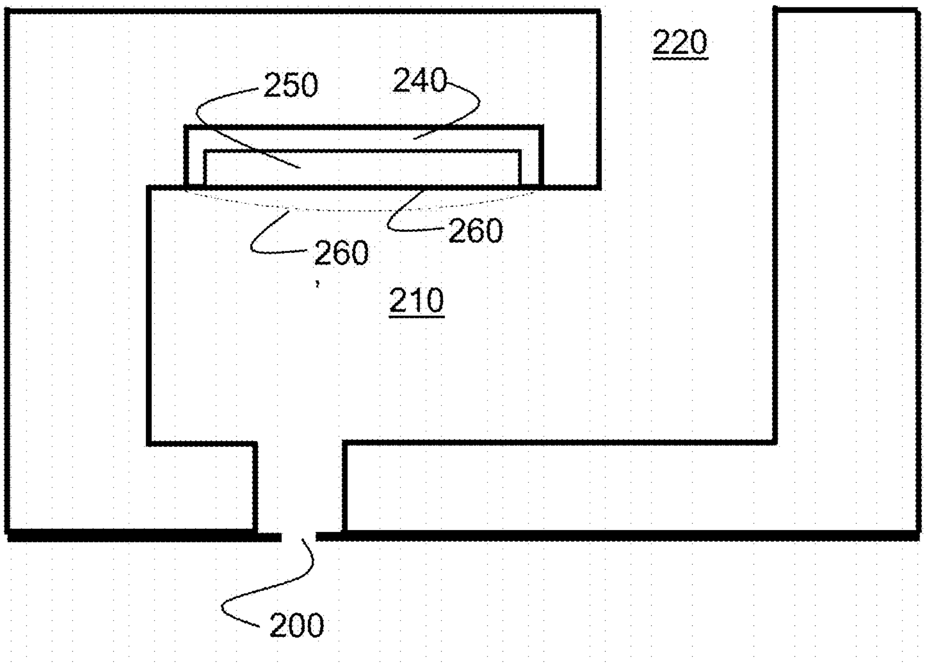
FIG. 3B is an alternative schematic representation of a part of the drop forming device as shown in FIGS. 1 and 2A.

FIG. 3B shows a schematic representation of a part of a drop forming device as described above. The drop forming device shown in FIG. 3B comprises an actuator cavity 240, comprising a piezo electric element 250 and a membrane 260 separating the actuator cavity from the pressure generating chamber 210. Piezo electric elements deform when electrically actuated, which deformation is schematically exemplified in FIG. 3B. by a bulging membrane (dotted line 260'). Such deformation creates a pressure wave in the pressure generating chamber that propagates through the pressure generating chamber towards the nozzle 200 where ink droplets are expelled.

In both examples of droplet forming devices shown in FIGS. 3A and 3B, an ink return path may be implemented from the pressure generating chamber 210 to the ink handling system 10 as shown in FIGS. 1 and 2A. Such return path enables throughflow of ink through the pressure generating chamber 210.

In both examples of droplet forming devices shown in FIGS. 3A and 3B actuation is performed at high frequencies. Besides generating pressure waves for expelling ink droplets from the nozzles, actuators generate heat that is dissipated to the surroundings of the actuators and may lead to uneven temperature distribution across an array of a plurality of nozzles, e.g. when nozzles in an array are not evenly actuated. The ink handling system provided by the present invention significantly improves the temperature uniformity across the array of a plurality of nozzles.

Examples

Computational Fluid Dynamics simulations have been performed on practical designs based on the principles shown in FIG. 1 and FIG. 2 respectively. The energy dissipation of a MEMS chip was estimated to be 3 W. The temperature uniformity (ΔT) across the length of a nozzle array (L) was calculated. For the simulation of the embodiment shown in FIG. 2, $L_1=L_2$ (a=1) and $L=L_1+L_2$. Besides the different geometries shown in FIG. 1 and FIG. 2 respectively, all other parameters, materials and other circumstances were kept constant. Therefore, any difference in temperature uniformity can be attributed to the geometry of the ink handling system.

Table 1 shows the simulation results obtained with Computational Fluid Dynamics (CFD) of both shown embodiments.

From Table 1 it can be concluded that in the configuration shown in FIG. 2, which is an embodiment according to the present invention, the temperature uniformity is almost a factor 3.9 improved compared to the configuration shown in FIG. 1, when no ink is circulated. When ink is circulated, the temperature uniformity is improved by a factor 2.4.

TABLE 1

Results CFD simulations

| | ΔT (° C.) No ink circulation | ΔT (° C.) With ink circulation (0.5 ml/sec) |
|---|---|---|
| FIG. 1 | 0.77 | 0.58 |
| FIG. 2 | 0.2 | 0.24 |

This application claims the benefit of EP 22183826.1 filed Jul. 8, 2022, which is hereby incorporated by reference herein in its entirety.

The invention claimed is:

1. An inkjet print head comprising:

a droplet forming device having a plurality of nozzles formed in a surface of the droplet forming device, a plurality of pressure generating chambers each of which is in fluid communication with a corresponding nozzle of the plurality of nozzles and a plurality of actuators, each of which is operatively connected to a corresponding pressure generating chamber of the plurality of pressure generating chambers and is configured to generate energy for ejecting ink, wherein the plurality of nozzles are arranged in an array extending in a first direction, wherein the droplet forming device is a micro-machined ink jet printing device; and an ink handling system having an ink storage volume which is in fluid connection with the plurality of pressure generating chambers of the droplet forming device, wherein the ink handling system further includes an ink entry port configured to supply ink to the ink storage volume, a first ink return port configured to collect ink from the ink storage volume, a second ink return port configured to collect ink from the ink storage volume, wherein the first ink return port is disposed at one end of the inkjet print head and the second ink return port is disposed at an end of the inkjet print head opposite the one end with respect to the first direction, and the ink entry port is disposed between the first ink return port and the second ink return port, wherein the ink handling system further includes an ink feed channel in fluid connection with the ink entry port and an ink return channel in fluid connection with the first ink return port and the second ink return port, wherein in a cross section of the ink handling system in a direction perpendicular to a direction in which the ink feed channel extends, the ink return channel in fluid connection with the first ink return port and the ink return channel in fluid connection with the second ink return port are connected, and the ink feed channel is not connected to the ink return channel in fluid connection with the first ink return port and the ink return channel in fluid connection with the second ink return port, and wherein the ink handling system is an integral part of the micro-machined ink jet printing device.

2. The inkjet print head according to claim 1, wherein the ink handling system is configured such that, in operation, ink is circulated through the ink handling system such that the circulated ink flows from the ink entry port to the first ink return port and the second ink return port in opposite directions parallel to the first direction in heat exchanging contact with the droplet forming device.

3. The inkjet print head according to claim 1, wherein the ink storage volume includes a manifold that is in fluid connection with each nozzle of the array of the plurality of nozzles via the corresponding pressure generating chamber, and the ink entry port, the first ink return port, and the second ink return port are in fluid connection with the manifold.

4. The inkjet print head according to claim 3, wherein the manifold includes an elongated ink chamber extending in a second direction substantially parallel to the first direction, in a third direction substantially parallel to a width of the array of the plurality of nozzles and perpendicular to the second direction, and in a fourth direction perpendicular to the second and third directions, and wherein the third and fourth directions define a cross sectional area of the elongated ink chamber and the size of the cross sectional area of the of the elongated ink chamber is smaller than or equal to a size of a cross sectional area of the ink entry port.

5. The inkjet print head according to claim 1, wherein the ink entry port is arranged halfway a distance between the first ink return port and the second ink return port.

6. A printer comprising:

at least one inkjet print head having:

a droplet forming device having a plurality of nozzles formed in a surface of the droplet forming device, a plurality of pressure generating chambers each of which is in fluid communication with a corresponding nozzle of the plurality of nozzles and a plurality of actuators, each of which is operatively connected to a corresponding pressure generating chamber of the plurality of pressure generating chambers and is configured to generate energy for ejecting ink, wherein the plurality of nozzles are arranged in an array extending in a first direction, wherein the droplet forming device is a micro-machined ink jet printing device, an ink handling system having an ink storage volume which is in fluid connection with the plurality of pressure generating chambers of the droplet forming device, wherein the ink handling system further includes an ink entry port configured to supply ink to the ink storage volume, a first ink return port configured to collect ink from the ink storage volume, a second ink return port configured to collect ink from the ink storage volume, wherein the first ink return port is disposed at one end of the inkjet print head and the second ink return port is disposed at an end of the inkjet print head opposite the one end with respect to the first direction, and the ink entry port is disposed between the first ink return port and the second ink return port, wherein the ink handling system further includes an ink feed channel in fluid connection with the ink entry port and an ink return channel in fluid connection with the first ink return port and the second ink return port, wherein in a cross section of the ink handling system in a direction perpendicular to a direction in which the ink feed channel extends, the ink return channel in fluid connection with the first ink return port and the ink return channel in fluid connection with the second ink return port are connected, and the ink feed channel is not connected to the ink return channel in fluid connection with the first ink return port and the ink return channel in fluid connection with the second ink return port, and wherein the ink jet handling system is an integral part of the micro-machined ink jet printing device.

7. The printer according to claim 6, wherein the ink handling system is configured such that, in operation, ink is circulated through the ink handling system such that the circulated ink flows from the ink entry port to the first ink return port and the second ink return port in opposite directions parallel to the first direction in heat exchanging contact with the droplet forming device.

8. The printer according to claim 6, wherein the ink storage volume includes a manifold that is in fluid connection with each nozzle of the array of the plurality of nozzles via the corresponding pressure generating chamber, and the ink entry port, the first ink return port, and the second ink return port are in fluid connection with the manifold.

9. The printer according to claim 8, wherein the manifold includes an elongated ink chamber extending in a second direction substantially parallel to the first direction, in a third direction substantially parallel to a width of the array of the plurality of nozzles and perpendicular to the second direction, and in a fourth direction perpendicular to the second and third directions, and wherein the third and fourth directions define a cross sectional area of the elongated ink chamber and the size of the cross sectional area of the of the elongated ink chamber is smaller than or equal to a size of a cross sectional area of the ink entry port.

10. The printer according to claim 6, wherein the ink entry port is arranged halfway a distance between the first ink return port and the second ink return port.

* * * * *